US011688032B2

United States Patent
Mudigere et al.

(10) Patent No.: US 11,688,032 B2
(45) Date of Patent: Jun. 27, 2023

(54) THREE-DIMENSIONAL CONVOLUTION PIPELINE WITH MEMORY ORGANIZER UNIT

(71) Applicant: Meta Platforms, Inc., Menlo Park, CA (US)

(72) Inventors: Dheevatsa Mudigere, Fremont, CA (US); Krishnakumar Nair, Newark, CA (US); Abdulkadir Utku Diril, Menlo Park, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 725 days.

(21) Appl. No.: 16/543,239

(22) Filed: Aug. 16, 2019

(65) Prior Publication Data

US 2021/0049426 A1 Feb. 18, 2021

(51) Int. Cl.
*G06T 1/60* (2006.01)
*G06F 17/16* (2006.01)
*G06N 3/082* (2023.01)
*G06F 17/15* (2006.01)
*G06F 18/2451* (2023.01)

(52) U.S. Cl.
CPC .......... *G06T 1/60* (2013.01); *G06F 17/153* (2013.01); *G06F 17/16* (2013.01); *G06F 18/2451* (2023.01); *G06N 3/082* (2013.01)

(58) Field of Classification Search
None
See application file for complete search history.

(56) References Cited

U.S. PATENT DOCUMENTS

| 11,275,560 | B2* | 3/2022 | Ulrich | G06F 7/5443 |
| 2016/0239706 | A1* | 8/2016 | Dijkman | G06V 10/454 |
| 2019/0026078 | A1* | 1/2019 | Bannon | G06T 1/20 |
| 2020/0202200 | A1* | 6/2020 | Son | G06N 3/0454 |

OTHER PUBLICATIONS

Liu, G., Shih, K. J., Wang, T. C., Reda, F. A., Sapra, K., Yu, Z., . . . & Catanzaro, B. (Nov. 28, 2018). Partial convolution based padding. arXiv preprint arXiv:1811.11718. https://arxiv.org/pdf/1811.11718.pdf (Year: 2018).*
Akopyan et al. "Large-Scale YouTube-8M Video Understanding with Deep Neural Networks", CVPR 2017.
Hara et al. "Can Spatiotemporal 3D CNNs Retrace the History of 2D CNNs and ImageNet?", CVPR 2018.
Ji et al. "3D Convolutional Neural Networks for Human Action Recognition", PAMI 2014.

(Continued)

*Primary Examiner* — Tahmina N Ansari
(74) *Attorney, Agent, or Firm* — Van Pelt, Yi & James LLP (57) ABSTRACT

A processor system comprises a memory organizer unit and a matrix computing unit. The memory organizer unit is configured to receive a request for a three-dimensional data of a convolutional neural network layer. The requested three-dimensional data is obtained from a memory. The obtained three-dimensional data is rearranged in an optimized linear order and the rearranged data in the optimized linear order is provided to the matrix computing unit. The matrix computing unit is configured to perform at least a portion of a three-dimensional convolution using at least a portion of the provided rearranged data in the optimized linear order.

20 Claims, 9 Drawing Sheets

(56) References Cited

OTHER PUBLICATIONS

Karpathy et al. "Large-scale Video Classification with Convolutional Neural Networks", Computer Science Department, Stanford University. CVPR 2014.
Will Knight. "The Next Big Step for AI? Understanding Video". Dec. 6, 2017.
International Search Report and Written Opinion for International Application No. PCT/US2020/044625, dated Nov. 13, 2020, 11 Pages.
International Preliminary Report on Patentability for International Application No. PCT/US2020/044625, dated Mar. 3, 2022, 10 pages.

* cited by examiner

THREE-DIMENSIONAL CONVOLUTION PIPELINE WITH MEMORY ORGANIZER UNIT

BACKGROUND OF THE INVENTION

A whole class of complex artificial intelligence problems can be solved using neural networks. Since these problems are often computationally and data intensive, customized hardware solutions are often beneficial for improving the performance of neural networks. These customized microprocessors are typically designed to optimize solving a certain set of artificial intelligence problems. As the problem domain expands and neural networks are capable of solving more and different types of problems, traditional hardware compute resources may not be efficiently utilized. Therefore, there is a need for a hardware microprocessor system that can efficiently utilize existing hardware compute resources when processing less commonly used neural network operations, such as three-dimensional convolution operators.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A microprocessor system for performing three-dimensional convolutions with high efficiency is disclosed. In various embodiments, a microprocessor system includes a memory organizer unit that interfaces between memory and a matrix computing unit. The matrix computing unit is capable of performing traditional matrix operations for solving neural networks such as two-dimensional convolutional neural networks. In the event the matrix computing unit receives a three-dimensional convolution operation, the matrix computing unit receives the three-dimensional data associated with a convolutional neural network layer from the memory organizer unit. The memory organizer unit provides the three-dimensional data in a data format optimized for the matrix computing unit. In some embodiments, the memory organizer unit first obtains the requested data from memory, where the data may be stored in a layout format efficient for reading and/or writing but inefficient for performing the convolution operation. Once retrieved from memory, the memory organizer unit rearranges the three-dimensional data into an optimized linear order. For example, the data layout is rearranged into a layout format optimized for performing the three-dimensional convolution operation. The linearized data is then provided to the matrix computing unit. The matrix computing unit receives a set of weights associated with the three-dimensional convolution operation and the requested three-dimensional data of the convolutional neural network layer in an optimized linear order. Since the data layout is optimized for the matrix computing unit, when the three-dimensional convolution operation is performed, the compute performance of the matrix computing unit is highly efficient.

In some embodiments, the microprocessor system comprises a memory organizer unit and a matrix computing unit. For example, a microprocessor system includes a memory organizer unit that retrieves data for the matrix computing unit for performing a three-dimensional convolution. The memory organizer unit is configured to receive a request for three-dimensional data of a convolutional neural network layer. For example, a convolutional neural network layer includes three-dimensional input data. In some embodiments, the three-dimensional input data is video data, such as a series of image data captured over time. The three-dimensional data may be data with low arithmetic intensity. The memory organizer unit can receive requests for three-dimensional input data from a matrix computing unit, for example, in response to a convolution instruction to be performed by the matrix computing unit. In some embodiments, the request for three-dimensional input data is received from a control unit and not directly from the matrix computing unit. The memory organizer unit is configured to obtain the requested three-dimensional data from a memory. For example, the three-dimensional data may be stored in memory and is read from memory by the memory organizer unit. In various embodiments, the memory organizer unit rearranges the obtained three-dimensional data in an optimized linear order. For example, the three-dimensional data is stored in memory using a format that is inefficient for processing by the matrix computing unit. After reading the data from memory, the three-dimensional data is rearranged into an optimized linear order. In some embodiments, the optimized linear order is based on the three-dimensional filter (or kernel) used for performing the three-dimensional convolution. The memory organizer unit provides to the matrix computing unit the rearranged data in the optimized linear order. For example, the data is provided in a linear order to increase the efficiency of the matrix computing unit. In various embodiments, along with the rearranged data, the matrix computing unit receives a three-dimensional filter (or kernel) to perform the three-dimensional convolution. For example, a filter corresponding to filter weights is received by the matrix computing unit for applying to the rearranged data.

Figure 1:
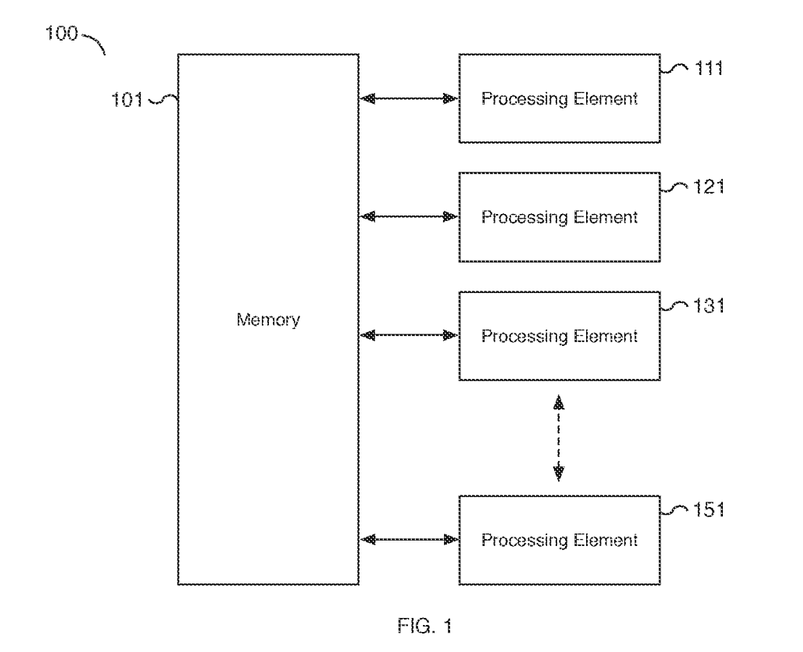
FIG. 1 is a block diagram illustrating an embodiment of a system for solving artificial intelligence problems using a neural network.

FIG. 1 is a block diagram illustrating an embodiment of a system for solving artificial intelligence problems using a neural network. In the example shown, system 100 includes memory 101 and processing elements 111, 121, 131, and 151. In some embodiments, memory 101 is a shared on-chip memory component that can be accessed by one or more processing elements such as processing elements 111, 121, 131, and 151. For example, processing element 111 can read and write data to on-chip memory corresponding to computations performed on a subset of a large data matrix. Processing element 121 can read and write data to on-chip memory corresponding to computations performed on a different subset of the same large data matrix. In this manner, different portions of a complex artificial intelligence problem can be solved by spreading the computational load across different processing elements. Processing elements 111, 121, 131, and 151 can each operate in parallel to solve a portion of a larger artificial intelligence problem. In various embodiments, system 100 of FIG. 1 may include fewer or more processing elements. For example, the number of processing elements can be scaled up or down, for example, depending on the intended computational requirements. In some embodiments, memory 101 is a last level cache (LLC) and/or may be implemented using static random-access memory (SRAM).

In some embodiments, the processing elements are used to solve layers of a neural network. For example, a processing element, such as one of processing elements 111, 121, 131, and/or 151, may be used to perform matrix operations such as convolution operations for applying a neural network to an input data set retrieved from memory 101. One or more different filters, kernels, convolution matrices, etc. may be applied to input data. In some embodiments, the convolution operations are three-dimensional convolution operations and the input data is three-dimensional input data. Processing elements 111, 121, 131, and 151 may access data from memory 101 via a memory organizer unit (not shown) that rearranges the requested data into an optimized layout for processing by a processing element. For example, each processing element may include a memory organizer unit (not shown) as part of the processing element for requesting data. As another example, multiple processing elements of system 100 may share a memory organizer unit (not shown) for accessing memory 101. In some embodiments, a memory organizer unit is configured to read data, such as data associated with a convolutional neural network layer, from memory 101. Once the data is read from memory 101, the memory organizer unit rearranges the data using a data layout format optimized for performing convolution operations. The rearranged data is provided to a matrix computing unit (not shown) of a processing element for performing a convolution operation. For example, the data may be rearranged into an optimized linear order to efficiently utilize the compute resources of a matrix computing unit associated with a processing element.

Figure 2:
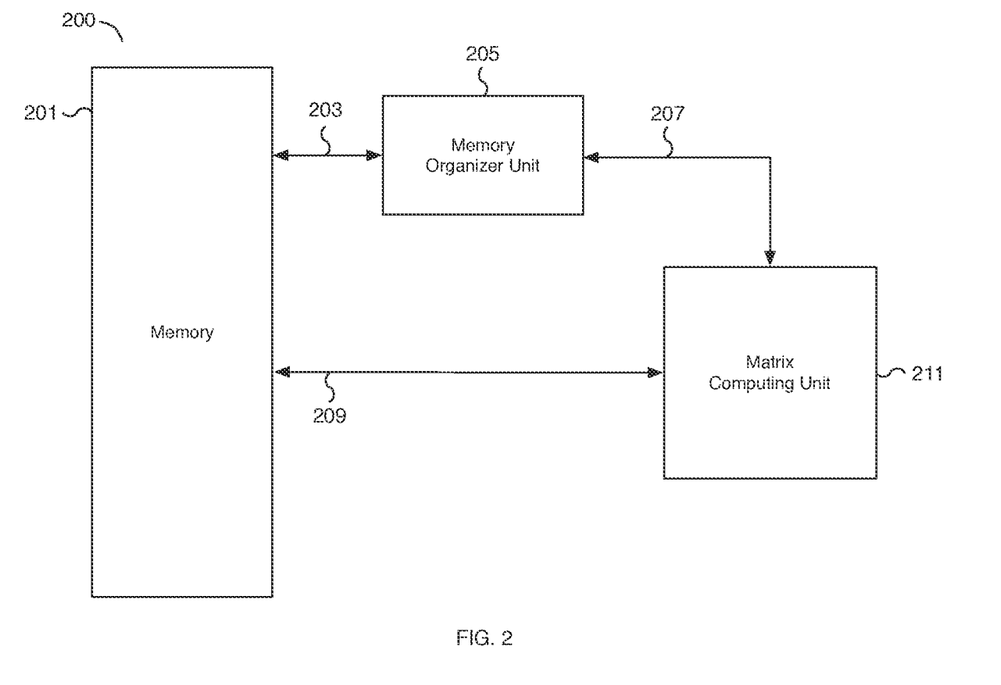
FIG. 2 is a block diagram illustrating an embodiment of a system for solving artificial intelligence problems using a neural network.

FIG. 2 is a block diagram illustrating an embodiment of a system for solving artificial intelligence problems using a neural network. In the example shown, system 200 includes memory 201, memory organizer unit 205, matrix computing unit 211, and data pathways 203, 207, and 209. Data pathways 203, 207, and 209 connect different components of system 200. For example, data pathway 203 communicatively connects memory 201 and memory organizer unit 205, data pathway 207 communicatively connects memory organizer unit 205 and matrix computing unit 211, and data pathway 209 communicatively connects memory 201 and matrix computing unit 211. In some embodiments, memory 201 is memory 101 of FIG. 1. In some embodiments, matrix computing unit 211 is part of a processing element such as processing elements 111, 121, 131, and 151 of FIG. 1. For example, each processing element, such as processing elements 111, 121, 131, and 151 of FIG. 1, includes a memory organizer unit such as memory organizer unit 205. In some embodiments, one or more processing elements share one or more memory organizer units. For example, a system with multiple processing elements may share a single memory organizer unit for accessing data. As another example, a system may include multiple memory organizer units that are shared by processing elements.

In some embodiments, convolutional neural network layer data is stored in memory 101. The data may be stored in a data layout format efficient for reading and/or writing data to and/or from a processing element. Although efficient for accessing or writing data, the memory data layout format may be inefficient for performing a matrix computation. Once the data is retrieved from memory 201, memory organizer unit 205 rearranges the data into a layout for efficiently performing a matrix computation. In various embodiments, matrix computing unit 211 receives a three-dimensional convolution operation. For example, a three-dimensional convolution operation can specify a particular three-dimensional convolution operation and include references to a data argument and a weight argument. The data and weight arguments may correspond to three-dimensional data such as three-dimensional matrices. For example, the data argument may correspond to video data. The weight data may correspond to a three-dimensional convolution filter such as a 3×3×3 kernel. In some embodiments, the data argument references convolutional neural network layer data stored in memory 201 and the weight argument may reference a three-dimensional convolution filter stored in memory 201 or another appropriate location. In various embodiments, matrix computing unit 211 retrieves the weight data associated with the weight argument via data pathway 209. For example, the weight data may be retrieved in linear order format. In some embodiments, matrix computing unit 211 requests the convolutional neural network layer data associated with the data argument from memory organizer unit 205 via data pathway 207. In some embodiments, the convolutional neural network layer data associated with the data argument is requested by a control unit (not shown) on behalf of matrix computing unit 211. For example, control logic of a control unit (not shown) can issue a three-dimensional convolution instruction to matrix computing unit 211 and an instruction to retrieve the three-dimensional data argument to memory organizer unit 205. In response to the request for data, matrix organizer unit 205 requests the data from memory 201 via data pathway 203 and rearranges the data in a optimized order, such as an optimized linear order. The rearranged data is provided by memory organizer unit 205 to matrix computing unit 211 via data pathway 207.

In various embodiments, once matrix computing unit 211 receives the data and weight operands, matrix computing unit 211 performs a matrix operation. In some embodiments, matrix computing unit 211 is a matrix compute engine such as a dot product engine and the matrix operation is a dot product operation. In various embodiments, the result of the matrix operation is written back to memory 201 via a data pathway such as data pathway 209. In some embodiments, matrix computing unit 211 utilizes a two-dimensional matrix compute engine. For example, the three-dimensional operands for data and weight matrices may be sliced into two-dimensional matrices. The three-dimensional convolution operation is performed by performing multiple two-dimensional convolution operations using the two-dimensional slices of the three-dimensional matrix arguments. The two-dimensional data matrices are provided by memory organizer unit 205 to the two-dimensional matrix compute engine of matrix computing unit 211.

Figure 3:
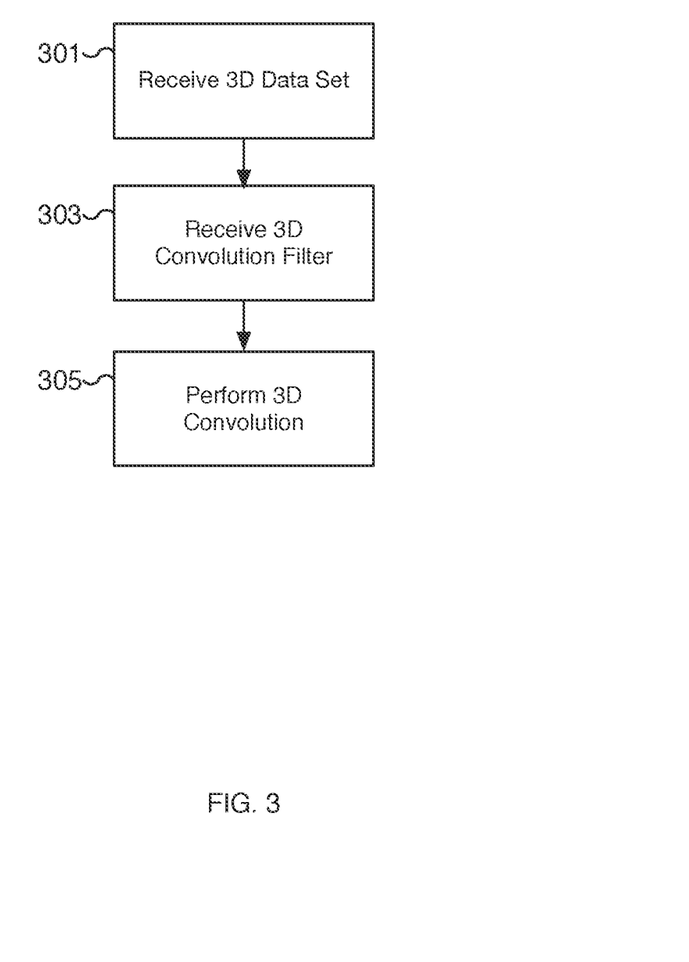
FIG. 3 is a flow chart illustrating an embodiment of a process for solving artificial intelligence problems using a neural network.

FIG. 3 is a flow chart illustrating an embodiment of a process for solving artificial intelligence problems using a neural network. For example, the process of FIG. 3 is used to determine the result of a layer of a multi-layer neural network. In some embodiments, the neural network is a convolutional neural network (CNN) used to analyze three-dimensional data to solve complex artificial intelligence problems such as image recognition and recommendations. For example, the CNN can be used to analyze data such as video data for relevant recommendations. Recommendations may include related video, products and/or services related to the video, other video producers with related content, and/or non-video content related to the video, etc. In some embodiments, the analysis is used to identify properties of the content. For example, the content can be analyzed for integrity, identification, relevancy, etc. In some embodiments, the neural network is applied using system 100 of FIG. 1 and/or system 200 of FIG. 2.

At 301, a three-dimensional data set is received. For example, input data is received that corresponds to three-dimensional data such as video data. In some embodiments, the data is the output of a previous neural network layer. The three-dimensional data has a corresponding height, width, and number of channels and may be stored in memory such as shared memory or another appropriate storage medium. In some embodiments, the amount of data is significantly large and the data layout format is optimized for storing and/or retrieving the data. For example, the data layout format may be optimized for efficiently retrieving a three-dimensional subset of a large three-dimensional input data source. Since the data is optimized for access to memory, the data layout format may be inefficient for performing a convolution operation. In some embodiments, the three-dimensional data set is stored in a memory such as memory 201 of FIG. 2 and retrieved via a memory organizer unit such as memory organizer unit 205 of FIG. 2 via data pathways 203 and/or 207 of FIG. 2 in an optimized linear order. In some embodiments, the three-dimensional data is received at a matrix computing unit such as matrix computing unit 211 of FIG. 2.

At 303, a three-dimensional convolution filter is received. In various embodiments, the three-dimensional convolution filter is received at a matrix computing unit such as matrix computing unit 211 of FIG. 2. The size of the three-dimensional convolutional filter may be sized based on the matrix computing unit. For example, a matrix computing unit that processes two 32-element vectors may utilize a 3×3×3 convolution filter. The 3×3×3 convolution filter can be linearized and each of the 27 elements can be loaded into an input vector. In some embodiments, the filter may be received in an optimized linear order. The optimized linear order may utilize zero-value elements, for example, as padding. For example, a 32-element vector includes 27 elements from the convolution filter and the remaining 5 elements are filled with zero values. In various embodiments, the spacing of the elements is arranged to optimize the convolution operation and may include zero-value elements between rows and/or columns. Depending on the application, the filter may be stored in memory in the optimized format and/or rearranged into an optimized linear order once retrieved from memory. In some embodiments, the three-dimensional convolution filter is stored in a memory such as memory 201 of FIG. 2 and received via data pathway 209 of FIG. 2 at a matrix computing unit such as matrix computing unit 211 of FIG. 2. In some embodiments, the three-dimensional convolution filter is retrieved via a memory organizer unit that rearranges the three-dimensional convolution filter into a linear optimized format.

At 305, a three-dimensional convolution operation is performed. Using the data set received at 301 and the convolution filter received at 303, a three-dimensional convolution operation is performed. In various embodiments, the operation is performed using a matrix computing unit such as matrix computing unit 211 of FIG. 2. The operation may be performed in response to receiving a convolution operation at the matrix computing unit that specifies the data set and convolution filter. In some embodiments, the result of the convolution operation is written to memory such as memory 101 of FIG. 1 and/or memory 201 of FIG. 2. In some embodiments, the convolution result is stored in a local accumulator as a partial result and used for subsequent convolution operations.

Figure 4:
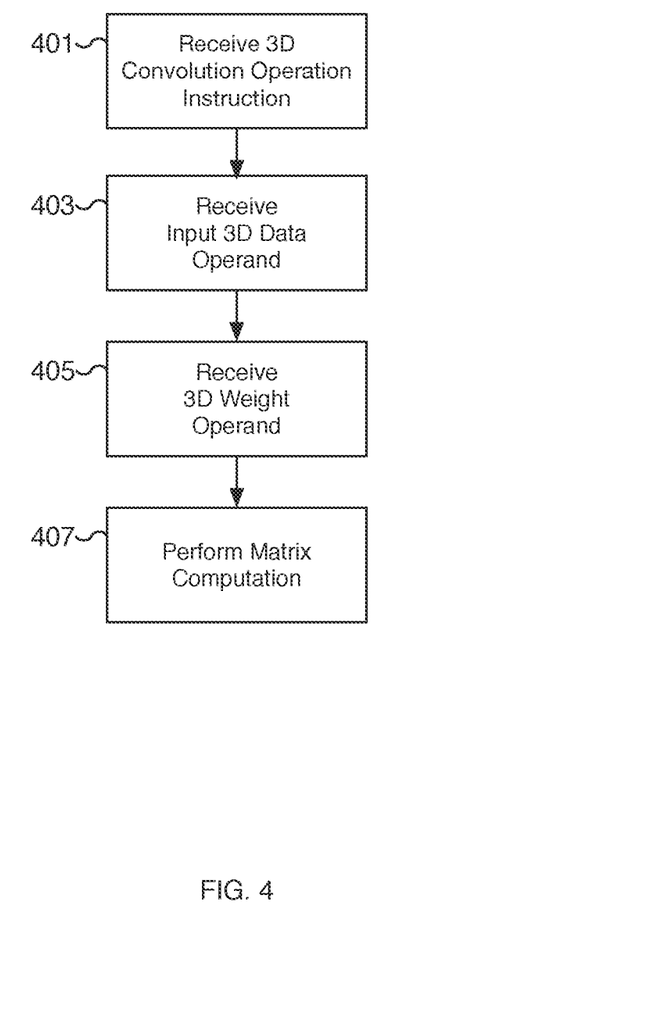
FIG. 4 is a flow chart illustrating an embodiment of a process for performing a three-dimensional convolution operation using a matrix computing unit.

FIG. 4 is a flow chart illustrating an embodiment of a process for performing a three-dimensional convolution operation using a matrix computing unit. For example, an artificial intelligence problem is solved using a neural network in part by analyzing one or more layers of the neural network using one or more matrix computing units from one or more processing elements. In some embodiments, a complex and large artificial intelligence problem is subdivided into smaller problems that are distributed to one or more different processing elements. Each processing element can perform its assigned sub-problem using its associated matrix computing unit. In some embodiments, the processing elements are processing elements 111, 121, 131, and/or 151 of FIG. 1. In some embodiments, the matrix computing unit is matrix computing unit 211 of FIG. 2. In various embodiments, a matrix computing unit solves a convolution problem associated with a neural network in response to receiving a convolution operation instruction.

At 401, a three-dimensional convolution operation instruction is received. In some embodiments, the convolution operation instruction is a matrix computing unit instruction directed at the matrix computing unit to perform a three-dimensional convolution operation. The instruction may include references to a data operand and a weight operand. In various embodiments, the data operand references a three-dimensional data matrix and the weight operand references a three-dimensional weight matrix. The three-dimensional data operand may be convolutional neural network layer data and the weight operand may be a convolution filter, such as a 3×3×3 kernel. In some embodiments, an operand reference may be a memory location, a register, or another appropriate data location. In various embodiments, the operand reference may describe an operand such as the size and/or dimensions of the expected operand. In some embodiments, the convolution instruction includes an output destination for the three-dimensional convolution result. For example, the convolution result may be directed to be stored in a vector accumulator, written to memory, and/or stored in another appropriate location.

At 403, an input three-dimensional data operand is received. For example, a three-dimensional data operand is retrieved from memory by requesting the input three-dimensional data from a memory organizer unit. In some embodiments, the data is received by issuing a retrieve operation to the memory organizer unit and referencing the requested data, for example, by address location. In some embodiments, the matrix computing unit passively receives the data from the memory organizer unit. For example, a control logic separate from the matrix computing unit issues a retrieve instruction to the memory organizer unit to provide the data to the matrix computing unit. In some embodiments, the memory organizer unit is memory organizer unit 205 of FIG. 2. The received data operand is formatted using a data layout optimized for the matrix computing unit. For example, the data layout can be in an optimized linear order. In some embodiments, the step of 403 is performed at 301 of FIG. 3.

At 405, a three-dimensional weight operand is received. For example, a three-dimensional weight operand is retrieved from memory by requesting the three-dimensional weight operand from memory. In some embodiments, the weight data is retrieved from memory without using a memory organizer unit. In some embodiments, the weight data is retrieved from memory by issuing a retrieve operation to the memory organizer unit and referencing the requested weight data, for example, by address location. In turn, the memory organizer unit retrieves the requested weight data for the matrix computing unit. In some embodiments, the memory organizer unit is memory organizer unit 205 of FIG. 2. The received weight data is formatted using a data layout optimized for the matrix computing unit. For example, the weight data layout can be in an optimized linear order. The weight data may be retrieved as two-dimensional slices of the three-dimensional weight operand. In some embodiments, the step of 405 is performed at 303 of FIG. 3.

At 407, a matrix computation is performed. For example, a matrix computing unit performs a matrix computation using the received input three-dimensional data and the received three-dimensional weight data. In some embodiments, the matrix computation is a three-dimensional convolution. The weight data is applied to the input data to determine a three-dimensional output result. In various embodiments, the data and weight operands are stored in input buffers of the matrix computing unit and the output result is stored in an output buffer and/or accumulator of the matrix computing unit. In some embodiments, the output result may be written to memory. In some embodiments, the step of 407 is performed at 305 of FIG. 3.

Figure 5:
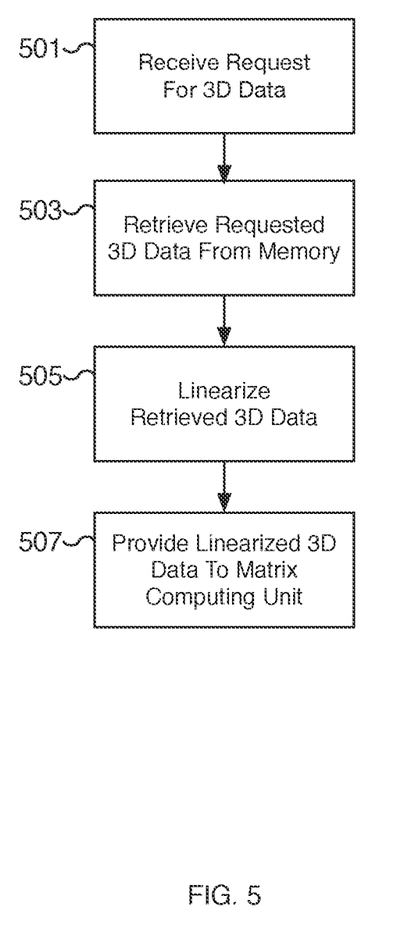
FIG. 5 is a flow chart illustrating an embodiment of a process for performing a three-dimensional convolution operation using a memory organizer unit.

FIG. 5 is a flow chart illustrating an embodiment of a process for performing a three-dimensional convolution operation using a memory organizer unit. For example, an artificial intelligence problem is solved using a neural network in part by analyzing one or more layers of the neural network using data requested from a memory organizer unit. The data may be requested from a processing element and/or matrix computing unit and is provided by the memory organizer unit in an optimized linear order. In some embodiments, the processing elements are processing elements 111, 121, 131, and/or 151 of FIG. 1. In some embodiments, the process of FIG. 5 is performed by a memory organizer unit such as memory organizer unit 205 of FIG. 2. In some embodiments, the process of FIG. 5 is performed at 301 of FIG. 3 and/or at 403 of FIG. 4 and/or is performed in response to a matrix computing unit receiving a convolution operation instruction. In various embodiments, the process of FIG. 5 is performed with respect to a three-dimensional weight operand to linearize a three-dimensional weight matrix. For example, the process of FIG. 5 may be performed at 303 of FIG. 3 and/or at 405 of FIG. 4.

At 501, a request for three-dimensional data is received. For example, a memory organizer unit receives a request for three-dimensional data such as convolutional neural network layer data. The data may correspond to three-dimensional data such as video data and may be requested by a processing element in response to the processing element receiving a convolution operation instruction. In some embodiments, the matrix computing unit of a processing element receives the convolution operation instruction and a request for the corresponding data is issued to the memory organizer unit. In various embodiments, the request for three-dimensional data includes an address location such as a memory location associated with the data. The location may include a depth, width, and number of channels to retrieve from a memory location.

At 503, the requested three-dimensional data is retrieved from memory. In response to the request received at 501, a memory organizer unit retrieves the requested data from memory. In some embodiments, the memory is a memory such as memory 101 of FIG. 1 and/or memory 201 of FIG. 2. The data may be retrieved from memory by a memory organizer unit as one or more memory read requests. For example, the requested data may be a subset of a larger three-dimensional data set and may be stored in memory as non-contiguous data. One or more non-sequential reads may be issued to retrieve the requested data. In various embodiments, the data may be stored in memory in a layout format efficient for memory access but inefficient for matrix computations.

At 505, the retrieved three-dimensional data is linearized. For example, the data requested from memory is received and rearranged into a linear format. In various embodiments, the data is linearized into an optimized linear order. The optimized linear order allows the data to be efficiently processed by a matrix computing unit, for example, for performing a convolution operation. The data may be linearized as one or more data requests to memory are fulfilled and data is received by the memory organizer unit. In various embodiments, the three-dimensional data requested is linearized into blocks that are sized based on the operating unit of a matrix computing unit. For example, a memory organizer unit can linearize the requested data into 32-element vectors for a matrix computing unit that operates on 32-element input vectors. In some embodiments, the data is linearized by slicing the requested three-dimensional data into multiple two-dimensional slices. Each two-dimensional slice is then linearized into an optimized linear order.

At 507, the linearized three-dimensional data is provided to a matrix computing unit. For example, the requested data is provided in optimized linear order to the matrix computing unit for performing a matrix computation such as a convolution operation. In some embodiments, the data is provided as a continuous stream of linear ordered data. The data may be organized based on two-dimensional slices of the requested three-dimensional data.

Figure 6:
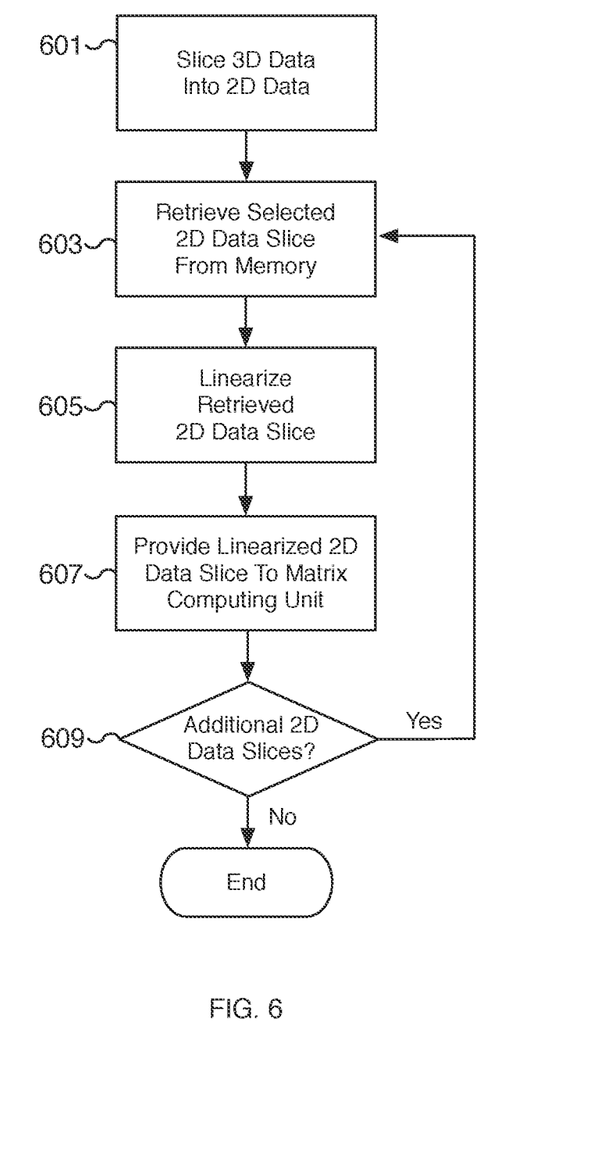
FIG. 6 is a flow chart illustrating an embodiment of a process for performing a three-dimensional convolution operation using a memory organizer unit.

FIG. 6 is a flow chart illustrating an embodiment of a process for performing a three-dimensional convolution operation using a memory organizer unit. In the example shown, a three-dimensional convolution is performed by slicing the three-dimensional data into multiple two-dimensional slices. The sliced two-dimensional data is retrieved from memory, linearized, and provided to a matrix computing unit for performing multiple two-dimensional convolutional operations that make up a three-dimensional convolution. In some embodiments, the three-dimensional convolution operations are performed by processing elements such as processing elements 111, 121, 131, and/or 151 of FIG. 1 and their respective matrix computing units. In some embodiments, the process of FIG. 6 is performed by a memory organizer unit such as memory organizer unit 205 of FIG. 2. In some embodiments, the process of FIG. 6 is performed at 301 of FIG. 3 and/or at 403 of FIG. 4 and/or is performed in response to a matrix computing unit receiving a convolution operation instruction. In some embodiments, the process of FIG. 6 is performed at 501, 503, 505, and/or 507 of FIG. 5. In various embodiments, the process of FIG. 6 is performed with respect to a three-dimensional weight operand to linearize a three-dimensional weight matrix using two-dimensional slices of a weight matrix. For example, the process of FIG. 6 may be performed at 303 of FIG. 3, at 405 of FIG. 4, and/or at 501, 503, 505, and/or 507 of FIG. 5.

At 601, three-dimensional data is sliced into two-dimensional data. For example, a three-dimensional data set is conceptually sliced into two-dimensional slices. As another example, a three-dimensional matrix is sliced into multiple two-dimensional matrices. Once sliced, each two-dimensional slice can be retrieved from memory and formatted in an optimized linear order for performing matrix operations.

At 603, a selected two-dimensional data slice is retrieved from memory. For example, a two-dimensional data slice is selected from the sliced three-dimensional data. In some embodiments, one or more memory reads may be issued to a memory for the selected two-dimensional data slice to retrieve the data associated with the slice. The data associated with the slice is retrieved in a layout format used for storing data. In some embodiments, the layout format may be non-contiguous and is not optimized for three-dimensional convolution operations.

At 605, the retrieved two-dimensional data slice is linearized. For example, the retrieved two-dimensional data slice is formatted in an optimized linear order for a matrix computing unit. The slice is linearized into a vector and padding may be inserted. For example, zero value elements may be inserted between rows (or columns) to align the two-dimensional data with a linearized weight matrix. In various embodiments, the linear order utilized is optimized for performing multiple two-dimensional convolutions to complete a three-dimensional convolution.

At 607, the linearized two-dimensional data slice is provided to the matrix computing unit. For example, using a data pathway between the memory organizer unit and the matrix computing unit, the linearized two-dimensional data slice is provided to the matrix computing unit for performing a convolution operation. In some embodiments, the linearized two-dimensional data slice is provided to an input buffer of the matrix computing unit for receiving input operands. In various embodiments, the matrix computing unit receives the provided linearized two-dimensional data slice for performing a two-dimensional convolution operation. For example, a pair of linearized two-dimensional slices (e.g., corresponding to a slice of a three-dimensional data matrix operand and a slice of a three-dimensional weight matrix operand) is received by a matrix computing unit to perform a matrix operation.

At 609, a determination is made whether additional two-dimensional data is available for processing. In the event an additional two-dimensional data slice is available, processing loops back to 603. In this manner, processing loops through all the slices of the three-dimensional data until each slice is processed and no additional slices are unprocessed. In the event no additional two-dimensional data slice is available, processing ends. In some embodiments, the completion of processing indicates that the entirety of the requested three-dimensional data has been provided to the matrix computing unit in an optimized linear order.

Figure 7A:
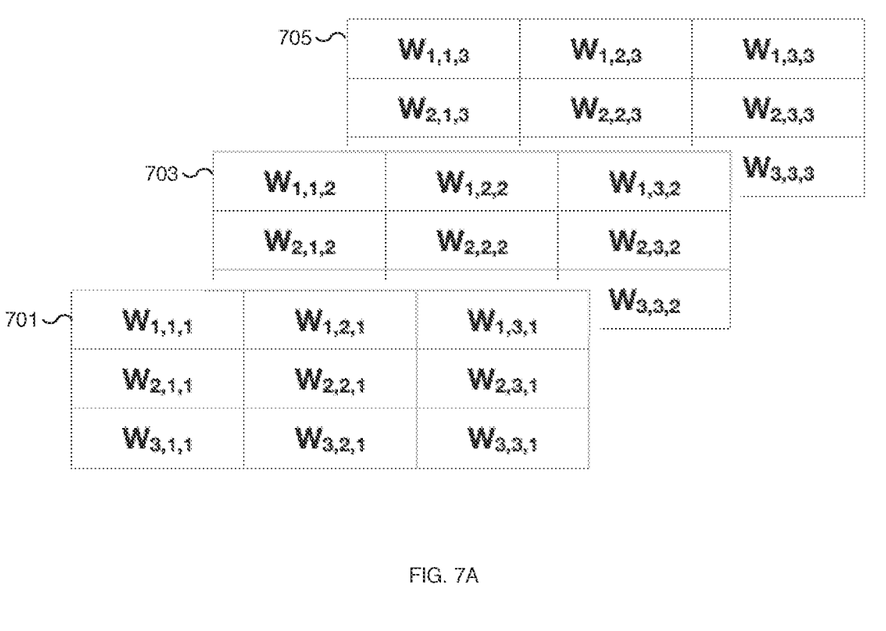
FIGS. 7A and 7B are diagrams illustrating example two-dimensional matrix slices for performing a two-dimensional convolution operation.
Figure 7B:
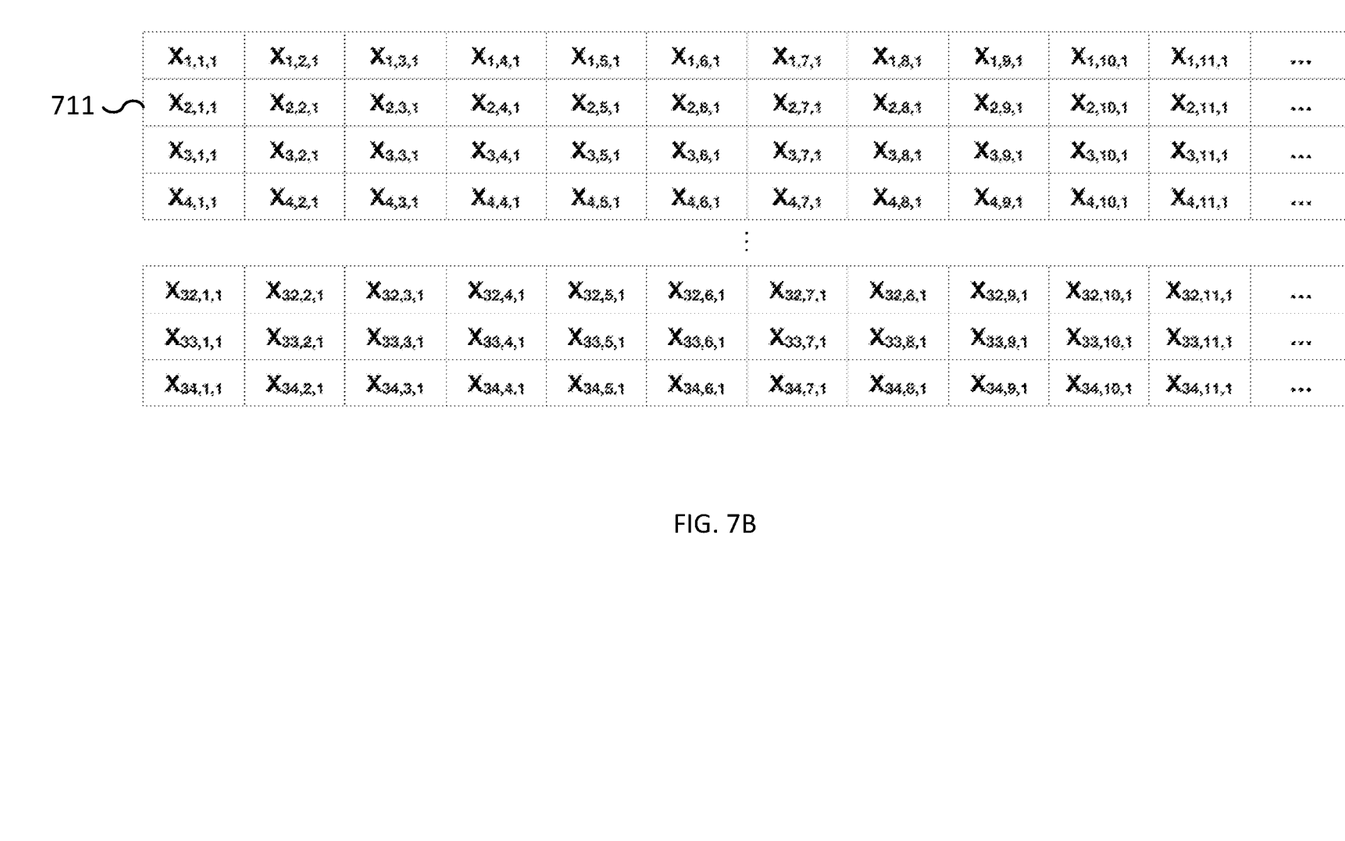

FIGS. 7A and 7B are diagrams illustrating example two-dimensional matrix slices for performing a two-dimensional convolution operation. In various embodiments, the two-dimensional convolution operation is a depthwise convolution operation. In FIG. 7A, weight matrix slices 701, 703, and 705 represents exemplar two-dimensional (e.g., 3×3) slices of a three-dimensional (e.g., 3×3×3) matrix of weight elements. Other dimensions for a three-dimensional weight (or filter) matrix may be appropriate as well, such as 5×5×5, 7×7×7, 9×9×9, etc. In various embodiments, the three-dimensional 3×3×3 weight matrix may correspond to the three-dimensional convolution filter received at 303 of FIG. 3 and/or the three-dimensional weight operand received at 405 of FIG. 4. With respect to the three-dimensional 3×3×3 weight matrix, weight matrix slice 701 is a 3×3 slice at depth 1, weight matrix slice 703 is a 3×3 slice at depth 2, and weight matrix slice 705 is a 3×3 slice at depth 3. In the example shown, the subscripts associated with each weight element use a (row, column, depth) notation. Weight matrix slice 701 references elements at a depth of 1. For the first row of weight matrix slice 701, $W_{1,1,1}$ is the weight element located at column 1 and depth 1, $W_{1,2,1}$ is the weight element located at column 2 and depth 1; and $W_{1,3,1}$ the weight element located at column 3 and depth 1.

In FIG. 7B, data matrix slice 711 represents an exemplar two-dimensional slice of a three-dimensional matrix of data elements. The dimensions of data matrix slice 711 are larger than weight matrix slices 701, 703, and 705 and are based on the size capabilities of matrix computing unit. In the example of FIG. 7B, only rows 1-4 and 32-34 at depth 1 of data matrix slice 711 are shown. The width of data matrix slice 711 can extend past 11 columns. Similarly, the height of data matrix slice 711 can extend past 34 rows (not shown). In FIG. 7B, data matrix slice 711 is shown with 34 rows to make it compatible with 3×3 weight matrix slices 701, 703, and 705 and a matrix computing unit with 32 vector units. In the example shown, data matrix slice 711 is but one slice of a three-dimensional data matrix. In various embodiments, the three-dimensional data matrix may correspond to the three-dimensional data set received at 301 of FIG. 3 and/or the three-dimensional data operand received at 403 of FIG. 4.

In some embodiments, weight matrix slices 701, 703, and 705 and data matrix slice 711 are examples of two-dimensional matrices sliced from three-dimensional matrices along the depth axis. Other slicing techniques are appropriate as well. In some embodiments, the slicing is performed at 601 of FIG. 6 and at least portions of the slices are linearized and provided to a matrix computing unit for performing two-dimensional convolution operations. In some embodiments, the convolution operations, such as a depthwise convolution, is performed using matrix computing unit 211 of FIG. 2.

Figure 8:
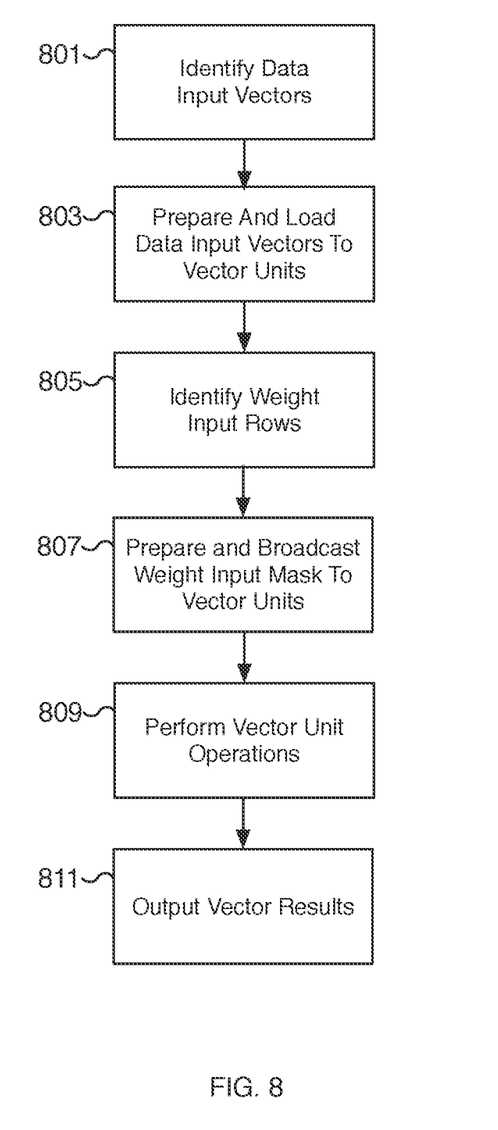
FIG. 8 is a flow chart illustrating an embodiment of a process for performing a two-dimensional convolution operation using linearized operands and a matrix computing unit.

FIG. 8 is a flow chart illustrating an embodiment of a process for performing a two-dimensional convolution operation using linearized operands and a matrix computing unit. For example, using the process of FIG. 6, input matrices are linearized from a two-dimensional matrix slice and fed as input vectors to a matrix computing unit. In some embodiments, each pair of linearized input vectors, for example, a weight input vector and a data input vector, is processed by a vector unit of the matrix computing unit. The vector units of the matrix computing unit compute at least a partial result for the two-dimensional convolution operation using the linearized operands. In some embodiments, the partial result is a dot product result used to compute a three-dimensional convolution result. In various embodiments, the process of FIG. 8 is performed at 603, 605, 607 of FIG. 6. In some embodiments, the process of FIG. 8 is performed using memory organizer unit 205 and matrix computing unit 211 of FIG. 2.

At 801, data input vectors are identified. For example, one or more data input vectors are identified from a data matrix slice. In some embodiments, a data input vector is identified and prepared for each vector unit of a matrix computing unit. The data input vectors may include overlapping elements and correspond to selected elements used for performing a matrix operation, such as a two-dimensional convolution operation.

At 803, data input vectors are prepared and loaded to vector units. For example, elements corresponding to a subset of a data matrix slice are identified. In some embodiments, the data matrix slice may be a two-dimensional matrix slice of a larger three-dimensional data matrix. In various embodiments, the identified elements are a subset of the data matrix slice and selected based on a corresponding weight matrix slice and in particular the dimensions of the weight matrix slice and the number of rows that will be linearized. For example, in some embodiments, an entire weight matrix slice can be unrolled and linearized to fit into a vector unit operand. However, as the dimensions of the weight matrix slice increase relative to the size of operands supported by the vector unit, the weight matrix slice may be too large to be unrolled into a single input vector and instead the weight matrix slice and corresponding data matrix slice are unrolled and linearized across multiple iterations.

In various embodiments, a weight matrix slice is linearized by either fully unrolling the slice in one iteration or partially unrolling the slice across multiple iterations. Whether a matrix slice is fully or partially unrolled can depend on the dimensions of the two-dimensional matrix arguments, in particular the weight matrix slice, relative to the size of the supported input vectors for the matrix computing unit. For example, in a scenario with a 3×3 weight matrix slice and support for a 32-element input vector, all nine elements (corresponding to three rows) of the weight matrix slice can be unrolled into a single 32-element weight input vector. As part of preparing a corresponding data input vector, elements from columns corresponding to three rows of the data matrix slice are selected. The selected elements from three rows are linearized into a one-dimensional vector. The number of columns utilized may be based on the size of the data input vector. In the example scenario with a 32-element data input vector, three rows are identified and 10 elements (corresponding to 10 columns) for each row are selected. A total of 30 elements are selected from three rows and ten columns. The remaining two locations in the data input vector for two elements are insufficient to fit an entire column from the identified three rows and instead are padded, for example, with two zero-value elements. In this manner, a 3×10 portion of a data matrix slice can be unrolled and linearized into a data input vector and padded with two zero-value elements. Once prepared, the data input vector is loaded to an appropriate vector unit of the matrix computing unit. In various embodiments, each vector unit of the matrix computing unit is loaded with a prepared data input vector. For example, each vector unit of the matrix computing unit can be loaded by selecting elements starting with a different row.

In some embodiments, the initial number of columns to select from for preparing a data input vector is determined by dividing the size of the data input vector by the number of rows being unrolled. For example, in the event two, three, or four rows are being unrolled, a 32-element data input vector can be loaded with elements from sixteen, ten, or eight columns, respectively. Any unused elements of the data input vector can be filled with zero-value elements as padding. Once the number of columns is determined, each iteration can utilize the same number of columns. For example, a 7×7 matrix slice can be loaded into a 32-element data input vector over four iterations. For the first three iterations, two rows (i.e., rows 1-2, 3-4, and 5-6) are unrolled each iteration and the last row (i.e., row 7) is unrolled for the fourth iteration. Each iteration can select 16 elements from different columns for the corresponding selected rows. The last iteration has additional padding since only one row is being unrolled. In various embodiments, zero-value elements are used as padding elements. A padding element with a value of zero allows the vector unit to perform certain vector operations, such as vector multiply and vector addition operations, with no impact on a resulting vector sum or dot product result.

In various embodiments, once properly prepared using the appropriate format, a data input vector is loaded into a corresponding vector unit of the matrix computing unit. In some embodiments, a data input vector is prepared and loaded into each of the vector units of the matrix computing unit. For example, the data input vector prepared for each vector unit can correspond to a sub-matrix of the data input matrix slice with each sub-matrix starting at a different row of the data input matrix slice. For example, in the event the weight matrix slice is a fully unrolled 3×3 matrix, the first vector unit may correspond to a sub-matrix with elements from rows 1-3, the second vector unit may correspond to a sub-matrix with elements from rows 2-4, the third vector unit may correspond to a sub-matrix with elements from rows 3-5, and so forth. In an embodiment, with 32 vector units, the 32nd vector unit may correspond to a sub-matrix with elements from rows 32-34.

At 805, weight input rows are identified. For example, one or more rows from a weight input matrix slice are identified for performing vector unit operations. In some embodiments, a weight input matrix slice is fully unrolled and each row of the weight input matrix slice is identified for unrolling and linearization. In various embodiments, a weight input matrix slice may be too large for full unrolling and is only partially unrolled. Only the rows selected for unrolling are identified for further processing at 807. For example, a 3×3 weight matrix slice (with 9 elements) can be fully unrolled into a 32-element weight input vector so each row of the weight matrix slice is utilized. As another example, a 7×7 weight matrix slice (with 49 elements) cannot be fully unrolled into a 32-element weight input vector. Only the unrolled rows are identified for the current iteration. In various embodiments, successive iterations are used to identify the remaining rows.

At 807, a weight input mask is prepared and broadcasted to the vector units. For example, elements corresponding to the weight input rows identified at 805 are prepared into a weight input mask. The weight input mask is linearized as a one-dimensional input vector for the vector units of the matrix computing unit. In various embodiments, the linearized weight elements are formatted with padding to align the start of each weight input row with an associated data input row prepared at 803. For example, using a 32-element vector and a 3×3 weight matrix slice with all rows identified at 805, all nine elements of the weight matrix slice are selected. The nine elements of the weight matrix slice are formatted into a weight input mask using an additional 23 padding elements. In some embodiments, 30 elements are used for the three rows of the selected 3×3 matrix. Each row includes three elements from a row followed by seven padding elements. The remaining elements of a data input vector not used for the rows of the selected 3×3 matrix, in this example, two elements, are filled with additional padding elements. In various embodiments, zero-value elements are used as padding elements. A padding element with a value of zero allows the vector unit to perform multiply and addition vector operations with no impact on a resulting vector sum.

In various embodiments, the formatted weight input mask is an input vector that is broadcasted to each vector unit of a matrix computing unit. For example, a weight input vector is used to store the prepared weight input mask in a linearized one-dimensional vector format. The weight input mask is then broadcasted to each appropriate vector unit as an input vector operand. For example, a single weight input mask can be prepared and utilized by all the vector units of a matrix computing unit. In some embodiments, the row padding elements are utilized to allow the weight input mask to be shifted to realign the elements of the weight matrix slice with different columns of a data matrix slice as referenced in a data input vector.

At 809, vector unit operations are performed. Utilizing the input vectors loaded from data input vectors and the broadcasted weight input mask, the corresponding vector units of a matrix computing unit perform vector unit operations. In some embodiments, the vector unit operations include vector multiply and addition operations. For example, each element from a data input vector is multiplied by its corresponding element from the weight input mask. The result is a vector of multiplication results. In some embodiments, the vector multiplication operation is performed by a vector multiply unit of a vector unit. Using the vector multiply result, a vector sum result is calculated by adding each of the elements from the vector of multiplication results. In some embodiments, the sum is determined using a vector adder unit of the vector unit. For example, a vector adder unit using an adder tree can compute the sum of the vector elements. In some embodiments, the matrix computing unit includes an accumulator for adding the vector adder result with previous vector adder results. For example, intermediate or partial results from each iteration can be accumulated to determine a running accumulated sum using an accumulator. The accumulated sum allows the vector sum result from one iteration (or pass) to be added into the result of a subsequent iteration (or pass). In various embodiments, the zero-padded elements prepared for the weight input mask (and/or data input vector) result in a zero multiplication result and have no impact on the vector addition result. In some embodiments, each vector unit of a matrix computing unit performs a dot product operation using its corresponding loaded data input vector and the broadcasted weight input mask. The dot product result may be accumulated with the results from previous iterations (or passes) and/or stored to be added to the results of future iterations.

At 811, vector results are outputted. For example, the vector result determined by performing vector unit operations at 809 is outputted from the matrix computing unit. In some embodiments, the vector results are outputted to an output vector register that is used to write the output to memory, such as memory 201 of FIG. 2. In some embodiments, the results are outputted and used as an argument to a subsequent matrix operation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A processor system, comprising:
a memory organizer unit configured to:
receive a request for a three-dimensional data of a data matrix for a convolutional neural network layer;
obtain the requested three-dimensional data from a memory;
rearrange the obtained three-dimensional data in an optimized linear order, including by being configured to align a slice of the obtained three-dimensional data of the data matrix different from a weight matrix with a linearized version of the weight matrix including by being configured to insert one or more zero-value elements between elements of one or more rows or columns of the slice of the obtained three-dimensional data to optimize data organization layout at a hardware component interfacing between the memory and a matrix computing unit; and
provide to the matrix computing unit the rearranged data in the optimized linear order; and
the matrix computing unit configured to perform at least a portion of a three-dimensional convolution using at least a portion of the provided rearranged data in the optimized linear order.

2. The system of claim 1, wherein the three-dimensional data of the convolutional neural network layer is video data.

3. The system of claim 1, wherein the convolutional neural network layer is a layer of a neural network for determining recommendations.

4. The system of claim 1, wherein the convolutional neural network layer is a layer of a neural network for identifying content.

5. The system of claim 1, wherein the matrix computing unit is configured to receive a set of weights for performing the three-dimensional convolution.

6. The system of claim 5, wherein the set of weights is a three-dimensional matrix.

7. The system of claim 6, wherein the set of weights is a 3×3×3 kernel.

8. The system of claim 5, wherein the set of weights is formatted in a linear order.

9. The system of claim 1, wherein the matrix computing unit is configured to perform a dot product result.

10. The system of claim 1, wherein the matrix computing unit is a dot product engine.

11. The system of claim 1, wherein the rearranged data includes a plurality of linear two-dimensional slices of the three-dimensional data.

12. The system of claim 1, wherein the matrix computing unit is configured to receive a three-dimensional convolution operation instruction.

13. The system of claim 12, wherein the three-dimensional convolution operation instruction includes a first reference to a data argument and a second reference to a weight argument.

14. A method comprising:
- receiving a request for a three-dimensional data of a data matrix for a convolutional neural network layer;
- obtaining the requested three-dimensional data from a memory;
- rearranging the obtained three-dimensional data in an optimized linear order, including aligning a slice of the obtained three-dimensional data of the data matrix different from a weight matrix with a linearized version of the weight matrix including by inserting one or more zero-value elements between elements of one or more rows or columns of the slice of the obtained three-dimensional data to optimize data organization layout at a hardware component interfacing between the memory and a matrix computing unit; and
- providing to the matrix computing unit the rearranged data in the optimized linear order.

15. The method of claim 14, wherein the optimized linear order is optimized for performing a three-dimensional convolution operation.

16. A method comprising:
- receiving a three-dimensional convolution operation instruction, wherein the three-dimensional convolution operation instruction specifies a three-dimensional data of a data matrix for a convolutional neural network layer;
- requesting the three-dimensional data of the convolutional neural network layer from a memory organizer unit;
- receiving a linearized version of a weight matrix of a convolutional filter;
- receiving in an optimized linear order the requested three-dimensional data from the memory organizer unit, wherein the optimized linear order aligns a slice of the three-dimensional data of the data matrix different from a weight matrix with a linearized version of the weight matrix by including one or more zero-value elements inserted between elements of one or more rows or columns of the slice of the three-dimensional data to optimize data organization layout at a hardware component interfacing between a memory and a matrix computing unit; and
- performing at least a portion of a three-dimensional convolution using at least a portion of the received requested three-dimensional data in the optimized linear order and at least a portion of the linearized version of the weight matrix.

17. The method of claim 16, wherein the three-dimensional convolution operation instruction specifies a weight argument corresponding to the weight matrix.

18. The method of claim 16, wherein the three-dimensional convolution operation instruction includes an address location of a memory of the specified three-dimensional data of the convolutional neural network layer.

19. The method of claim 16, wherein the three-dimensional data of the convolutional neural network layer is video data.

20. The method of claim 16, wherein performing at least the portion of the three-dimensional convolution includes performing a dot product operation.

* * * * *